United States Patent
Tachibana et al.

(10) Patent No.: US 7,129,606 B2
(45) Date of Patent: Oct. 31, 2006

(54) VACUUMING MOTOR AND VACUUMING APPARATUS

(75) Inventors: Kenichi Tachibana, Fukuoka (JP); Tadataka Noguchi, Fukuoka (JP); Toshio Omata, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/660,652

(22) Filed: Sep. 12, 2003

(65) Prior Publication Data

US 2004/0061392 A1    Apr. 1, 2004

(30) Foreign Application Priority Data

Sep. 13, 2002  (JP) .......................... P.2002-267917

(51) Int. Cl.
  *H02K 7/02*  (2006.01)
(52) U.S. Cl. .......................... 310/75 R; 310/89; 310/86
(58) Field of Classification Search ............ 310/85–89, 310/75 R
  See application file for complete search history.

(56) References Cited

U.S. PATENT DOCUMENTS

| | | | | |
|---|---|---|---|---|
| 3,619,806 A | * | 11/1971 | Phillips | 331/69 |
| 3,995,167 A | * | 11/1976 | Kulig | 250/577 |
| 4,155,826 A | * | 5/1979 | Nakai et al. | 204/192.36 |
| 4,381,050 A | * | 4/1983 | Sunohara et al. | 477/95 |
| 4,391,151 A | * | 7/1983 | Nelson et al. | 73/863.23 |
| 4,686,861 A | * | 8/1987 | Morii | 73/862.68 |
| 4,697,978 A | * | 10/1987 | Tada et al. | 414/729 |
| 5,052,424 A | * | 10/1991 | Zerndt et al. | 137/1 |
| 5,223,113 A | * | 6/1993 | Kaneko et al. | 204/298.33 |
| 5,461,268 A | * | 10/1995 | Sanada | 310/51 |
| 5,847,476 A | * | 12/1998 | Elsing et al. | 310/51 |
| 5,906,860 A | * | 5/1999 | Motoda et al. | 427/240 |
| 6,119,553 A | * | 9/2000 | Yamagishi et al. | 74/640 |
| 6,395,093 B1 | * | 5/2002 | Ayers | 118/698 |
| 6,483,336 B1 | * | 11/2002 | Harris et al. | 324/765 |
| 6,543,257 B1 | * | 4/2003 | Koaizawa et al. | 65/489 |
| 6,592,679 B1 | * | 7/2003 | Krolak | 134/21 |

FOREIGN PATENT DOCUMENTS

JP    10-243609 A    9/1998

* cited by examiner

*Primary Examiner*—Dang Le
(74) *Attorney, Agent, or Firm*—Sughrue Mion, PLLC

(57) ABSTRACT

In a vacuuming motor used by being attached to a peripheral edge of a motor attaching hole provided at a vacuum chamber, an end portion on a load side of a motor main body is attached with a reduction gear main body having an attaching flange fixed to the motor attaching hole to interpose an O-ring therebetween and the attaching flange is fixed with vacuum seals and constituted by a resin and brought into contact with an output shaft of the reduction gear main body for partitioning an inner space of the reduction gear main body and the motor main body and an inner space of the vacuum chamber.

3 Claims, 1 Drawing Sheet

VACUUMING MOTOR AND VACUUMING APPARATUS

BACKGROUND OF THE INVENTION

The present invention relates to a vacuuming motor attached to a vacuum chamber and used as a drive apparatus or the like of a board transporting robot or the like, and a vacuuming apparatus.

As disclosed in JP-A-10-243609 (Japanese Patent Application Publication Number: Hei10-243609), a conventional vacuuming motor is used by putting a total of a drive portion thereof in a vacuum environment constituted by a vacuum chamber. In this case, for sealing inside of the vacuum chamber and inside of the vacuuming motor, a clearance between a rotating shaft thereof and a fixed portion of a housing or the like is closed by using an expensive part of a magnetic fluid or the like.

However, according to the vacuuming motor and vacuuming apparatus of the conventional art, the following problem is posed.

(1) A case of the vacuuming motor serves also as a partition wall between the atmosphere and vacuum and therefore, the case needs to strengthen more than necessary mechanical strength. Therefore, a total of the vacuuming motor is enlarged and heavy.

(2) Only a material or the like used in the drive portion which is suitable for the vacuum environment can be used and therefore, the cost is increased. Further, the motor becomes a special order product and therefore, time is taken for fabrication thereof.

SUMMARY OF THE INVENTION

The invention has been carried out in order to resolve the problem and it is an object thereof to provide a vacuuming motor which is small-sized and the light-weighed at low fabrication cost, and a vacuuming apparatus with such vacuuming motor.

In order to resolve the above-described problem, according to the invention, in a vacuuming motor used by being attached to a peripheral edge of a motor attaching hole provided at a vacuum chamber, an end portion on a load side of a motor main body is attached with a reduction gear main body having an attaching flange fixed to the motor attaching hole to interpose an O-ring therebetween and the attaching flange is fixed with a vacuum seal constituted by a resin and brought into contact with an output shaft of a reduction gear for partitioning an inner space of the reduction gear main body and the motor main body and an inner space of the vacuum chamber.

DESCRIPTION OF THE PREFERRED EMBODIMENT

Figure 1:
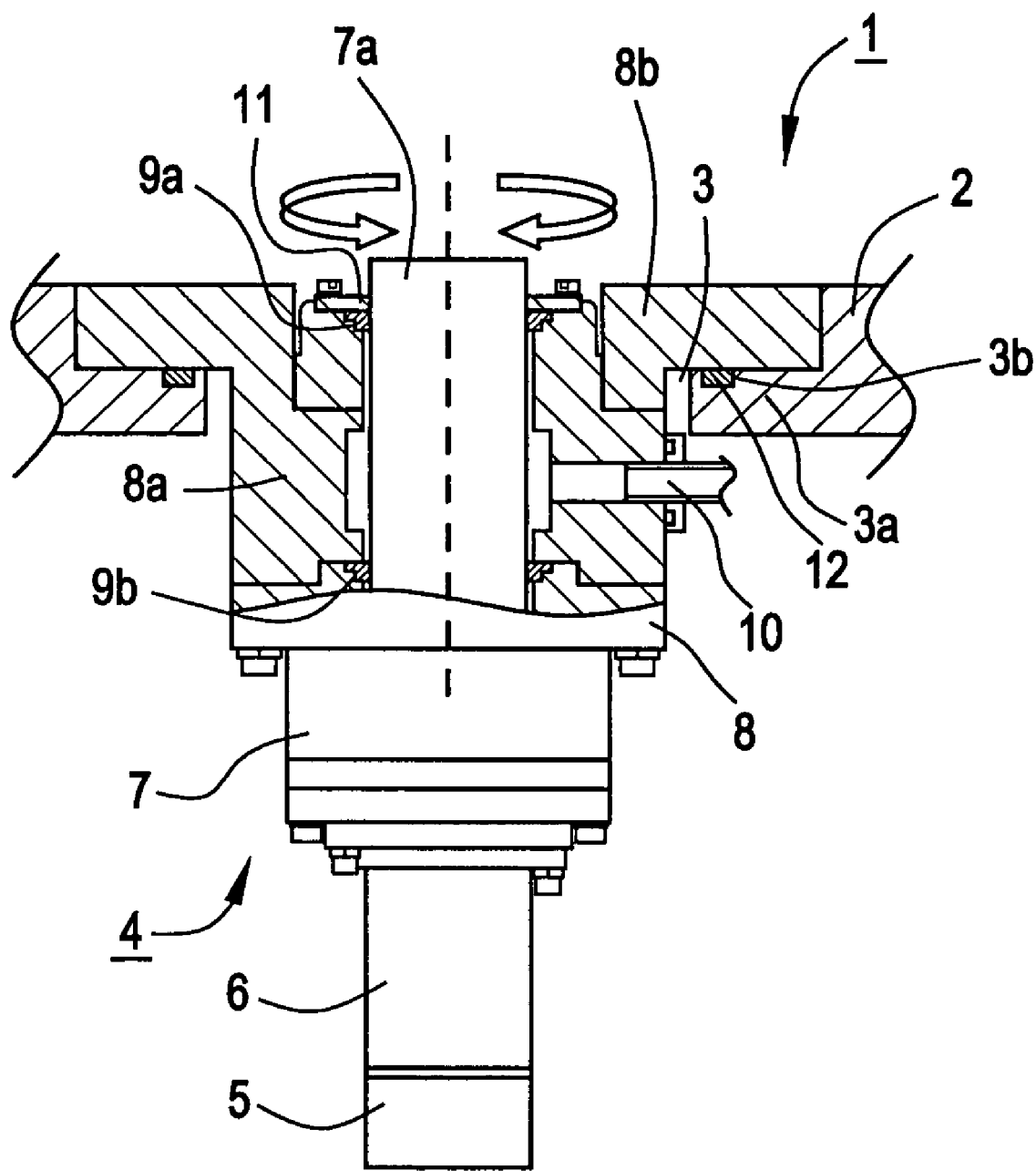
FIG. 1 is a side sectional view of a vacuuming motor showing an embodiment of the invention, showing a state of being attached in a vacuum chamber.

An embodiment of the invention will be explained in reference to the drawing as follows.

FIG. 1 is a side sectional view of a vacuuming motor for showing an embodiment of the invention, showing a state of being attached to a vacuum chamber.

In the drawing, numeral 1 designates a vacuum chamber, numeral 2 designates a floor portion of the vacuum chamber, numeral 3 designates a motor attaching hole provided at the floor portion 2, and numeral 4 designates a vacuuming motor comprising a motor main body 6 having a detector 5 and a reduction gear main body 7 attached to a front end portion of the motor main body 6. The reduction gear main body 7 includes an attaching flange 8 at a load side thereof. The attaching flange 8 includes a seal holding portion 8a fixed with vacuum seals 9a and 9b respectively at vicinities of both end portions in an axial direction thereof and provided with a middle sucking port 10 for vacuuming air at an interval between the vacuum seals 9a and 9b at a central portion thereof and a chamber attaching portion 8b in a ring-like shape attached to the seal holding portion 8a or integrally formed therewith to be attached to a peripheral edge 3a of the motor attaching hole 3 of the vacuum chamber 1.

The vacuum seals 9a and 9b are constituted by a resin and brought into contact with an output shaft 7a of the reduction gear main body 7 at inner peripheral faces thereof for partitioning an inner space of the motor main body 6 and the reduction gear main body 7 and an inner space of the vacuum chamber 1. Numeral 11 designates a seal cover attached to the seal holding portion 8a.

The chamber attaching portion 8b of the attaching flange 8 is fastened to fix to the peripheral edge 3a of the motor attaching hole 3 of the vacuum chamber 1 by a bolt or the like, not illustrated. When the chamber attaching portion 8b is fastened to the peripheral edge 3a of the motor attaching hole 3, an O-ring 12 is inserted into a groove 3b in a ring-like shape provided at the peripheral edge 3a to thereby prevent a clearance between the peripheral edge 3a and the chamber attaching portion 8b from being brought abut.

In such a constitution, inside of the vacuum chamber 1 is vacuumed as follows.

First, before starting to vacuum inside of the vacuum chamber 1, the interval between the vacuum seals 9a and 9b is vacuumed from the middle sucking port 10. Thereafter, inside of the vacuum chamber 1 starts to be vacuumed.

Thereby, both of the inside of the vacuum chamber 1 and the inside of the attaching flange 8 are vacuumed to make pressure uniform and therefore, pressure applied on the respective vacuum seals 9a and 9b, particularly, pressure applied on the vacuum seal 9a on the side of the vacuum chamber 1 can be reduced.

Thereby, the vacuum seals 9a and 9b can withstand high vacuum.

In such a constitution, when the vacuuming motor 4 is driven, dust and dirt or the like is produced at inside of the vacuuming motor 4, however, the inner space of the motor main body 6 and the reduction gear main body 7 and the inner space of the vacuum chamber 1 are partitioned by the vacuum seals 9a and 9b and therefore, dust and dirt or the like is not brought from the inside of the motor 6 and the reduction gear 7 into the vacuum chamber 1.

Further, at outside of the vacuuming motor 4, the O-ring 12 is interposed between the peripheral edge 3a and the chamber vacuum portion 8b and therefore, there is not a clearance between the peripheral edge 3 and the chamber attaching portion 8b and the atmosphere at outside of the vacuum chamber 1 is not brought from the portion of the peripheral edge 3a into the vacuum chamber 1.

As described above, according to the invention, the following effect is achieved.

(1) The motor main body and the reduction gear main body are arranged in the atmosphere, only a portion of the rotating shaft of the reduction bear main body is arranged in the vacuum environment and therefore, there is not a concern of discharging dust and dirt or the like from outer frame portions of the motor main body and the reduction gear main body into the vacuum environment. Therefore, the outer frame portions need not to strengthen more than necessary mechanical strength and a total of the vacuuming motor can be made to be small-sized and light-weighted.

(2) Also a material of the like used in the drive portion needs not to be suitable for the vacuum environment and therefore, the cost is reduced and time taken in fabrication thereof can also be shortened.

(3) Both inside of the vacuum chamber and inside of the attaching flange are vacuumed to make pressure uniform and therefore, pressure applied on the vacuum seal can be reduced and the vacuum seal can withstand high vacuum.

What is claimed is:

1. A vacuuming motor, for being attached to a peripheral edge of a motor attaching hole of a vacuum chamber and operable to be used as a drive apparatus of a board transporting robot in the vacuum chamber, comprising:
   a reduction gear main body attached to an end portion on a load side of a motor main body, including an attaching flange fixed to the motor attaching hole to interpose an O-ring there between; and
   vacuum seals fixed to the attaching flange, made of resin, contacting slidably with an output shaft of a reduction gear, for partitioning an inner space of the reduction gear main body and the motor main body and an inner space of the vacuum chamber,
   wherein the motor main body and the reduction gear main body are arranged in an atmosphere outside of the vacuum chamber
   wherein the vacuum seals further comprise a first vacuum seal and a second vacuum, seal,
   the first and the second vacuum seals define an inner space for being vacuumed,
   the first vacuum seal partitions the inner space of the reduction gear main body and the inner space between the first and the second vacuum seals for being vacuumed, and
   the second vacuum seal partitions the inner space between the first and the second vacuum seals for being vacuumed and the inner space of the vacuum chamber.

2. The vacuum motor according to claim 1, wherein the attaching flange includes:
   a seal holding portion fixed with the vacuum seals respectively at vicinities of both end portions thereof in an axial direction, having a middle sucking port for vacuuming air at an interval between the vacuum seals at a central portion thereof, wherein the middle sucking port is operable to be opened in a radial direction of the output shaft and vacuum air in the radial direction; and
   a chamber attaching portion having a ring-like shape, attached to the seal holding portion or integrally formed therewith, attached to a peripheral edge of the motor attaching hole of the vacuum chamber.

3. A vacuuming apparatus comprising:
   a vacuum chamber having a motor attaching hole therein;
   a motor main body, operable to be used as a drive source of a robot in the vacuum chamber;
   a reduction gear main body attached between the motor main body and a vacuum chamber, including an attaching flange attached to a peripheral edge of the motor attaching hole of the vacuum chamber via an O-ring,
   vacuum seal fixed to an inner surface of the attaching flange on two portions apart in an axial direction of an output shaft of a reduction gear, contacting slidably with the output shaft of the reduction gear,
   a middle sucking port for vacuuming air at an interval between the vacuum seals, wherein the middle sucking port is operable to be opened in a radial direction of the output shaft and vacuum air in the radial direction,
   wherein the motor main body and the reduction gear main body are arranged in an atmosphere outside of the vacuum chamber
   wherein the vacuum seals comprise a first vacuum seal and a second vacuum seal,
   the first and the second vacuum seals define an inner space for being vacuumed,
   the first vacuum seal partitions the inner space of the reduction near main body and the inner space between the first and the second vacuum seals for being vacuumed, and
   the second vacuum seal partitions the inner space between the first and the second vacuum seals for being vacuumed and the inner space of the vacuum chamber.

* * * * *